US011441411B2

(12) United States Patent
Venugopal et al.

(10) Patent No.: US 11,441,411 B2
(45) Date of Patent: Sep. 13, 2022

(54) OPTIMAL DRILLING PARAMETER MACHINE LEARNING SYSTEM AND METHODS (71) Applicant: NABORS DRILLING TECHNOLOGIES USA, INC., Houston, TX (US)

(72) Inventors: Suresh Venugopal, Spring, TX (US); Namitha Vinay, Cypress, TX (US)

(73) Assignee: NABORS DRILLING TECHNOLOGIES USA, INC., Houston, TX (US)

( * ) Notice: Subject to any disclaimer, the term of this patent is extended or adjusted under 35 U.S.C. 154(b) by 402 days.

(21) Appl. No.: 16/601,960

(22) Filed: Oct. 15, 2019

(65) Prior Publication Data

US 2021/0108500 A1  Apr. 15, 2021

(51) Int. Cl.
*E21B 44/00* (2006.01)
*E21B 41/00* (2006.01)
*G06N 7/00* (2006.01)
*G06N 20/00* (2019.01)

(52) U.S. Cl.
CPC .............. *E21B 44/00* (2013.01); *E21B 41/00* (2013.01); *G06N 7/005* (2013.01); *G06N 20/00* (2019.01); *E21B 2200/22* (2020.05)

(58) Field of Classification Search
CPC ...... E21B 44/00; E21B 41/00; E21B 2200/22; E21B 2200/20; G06N 7/005; G06N 20/00; G06N 3/08
See application file for complete search history.

(56) References Cited

U.S. PATENT DOCUMENTS

| 7,142,986 | B2 | 11/2006 | Moran |
| 7,172,037 | B2 | 2/2007 | Dashevskiy et al. |
| 10,233,728 | B2 | 3/2019 | Kristjansson et al. |
| 2012/0118636 | A1* | 5/2012 | Koederitz ............... E21B 44/00 175/24 |
| 2015/0129306 | A1 | 5/2015 | Coffman et al. |
| 2018/0024000 | A1* | 1/2018 | Turner .................... G06F 17/18 175/45 |
| 2019/0169986 | A1* | 6/2019 | Storm, Jr. ................ G01V 1/50 |
| 2020/0248545 | A1* | 8/2020 | Maus ........................ E21B 7/04 |

FOREIGN PATENT DOCUMENTS

| CA | 3003705 | C | * | 10/2019 | ......... G06K 9/00463 |
| CN | 112308269 | A | * | 2/2021 | |

* cited by examiner

*Primary Examiner* — Douglas Kay
(74) *Attorney, Agent, or Firm* — Haynes and Boone, LLP (57) ABSTRACT

A method of optimizing drilling and drilling instructions for different segments of a wellbore that includes: calculating mathematical approximations of energy transfer loss between a top drive and a BHA using a neural network and a plurality of drilling records for segments of wellbores that are similar to the segments of the wellbore to be drilled; calculating drilling instructions based on each mathematical approximation; drilling the wellbore using the drilling instructions; monitoring the energy transfer loss; and optimizing the drilling instructions using one of the mathematical approximations to minimize the energy transfer loss. Optimizing the drilling instructions includes using Bayesian optimization techniques.

20 Claims, 7 Drawing Sheets

OPTIMAL DRILLING PARAMETER MACHINE LEARNING SYSTEM AND METHODS

BACKGROUND

At the outset of a drilling operation for a planned wellbore, a drilling plan is established that includes a target location and a drilling path, or well plan, to the target location. The drilling plan also includes recommended drilling parameters, which are often identified by geologists, drilling optimization engineers, and drilling managers after a manual evaluation of geological data, operational data, engineering data, tool related data, casing data, and bit program related data. Often, a portion of the planned wellbore has distinctive characteristics that are similar to characteristics of historical wellbores. As such, data from historical wellbores is often helpful or relevant when creating a drilling plan that minimizes an energy transfer loss from the surface of the well to the bottom hole assembly ("BHA"). With conventional methods and due to the variety of variables affecting the energy transfer loss from the surface to the BHA, it is impossible to accurately identify relationships between the variables and the energy transfer loss. As such, it is impossible to identify optimal recommended drilling parameters to minimize the energy transfer loss from the surface to the BHA. Thus, the recommended drilling parameters generated by the geologists, drilling optimization engineers, and/or drilling manager are less than optimal.

Generally, these recommended drilling parameters are then manually fed into a drilling system for execution. Once drilling commences, the bottom hole assembly ("BHA") is directed or "steered" from a vertical drilling path in any number of directions, to follow the proposed well plan. The recommended drilling parameters may be altered during the drilling of the planned wellbore based on drilling performance and/or a driller's past experiences in an attempt to follow the proposed well plan and maximize a drilling parameter, such as rate of penetration, etc. This alteration or iteration of the recommended drilling parameters is often time consuming and tedious.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the present disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact and may also include embodiments in which additional features may be formed interposing the first and second features, such that the first and second features may not be in direct contact.

The apparatus and methods disclosed herein generally involves a two-step drilling parameter optimization process that results in the generation of drilling instructions in real-time or near real-time.

The first step includes generating a mathematical approximation of the energy transfer from the surface to the BHA for the planned wellbore using historical data from similar wellbores. As the planned wellbore often includes segments with different distinctive characteristics, multiple approximations may be generated for each wellbore, with one approximation for each distinctive segment of the planned wellbore. The apparatus and methods are not limited to generating approximations for wellbores having similar geographical characteristics and associated with similar equipment, but also consider other distinctive characteristics such as a client or owner, which often requires the adherence to specific best practice guidelines. As such, even for identical wellbores, the approximation for one client or owner may differ from the approximation for another client or owner. The approximation is used to generate recommended drilling parameters for the planned wellbore.

The second step includes optimizing the drilling parameters, using the relevant approximation for each distinctive segment, during the drilling of the planned wellbore to generate drilling instructions. As drilling proceeds, the apparatus and methods disclosed herein calculate the energy transfer loss from the surface to the BHA using real-time data, optimize the drilling parameters using the approximation and the calculated energy transfer loss, and then create updated drilling instructions based on the optimized drilling parameters. In some embodiments, the apparatus also automatically executes the updated drilling instructions. Generally, real-time data includes data received via a standard static survey and/or continuous data received from the BHA between two consecutive standard static surveys.

Figure 1:
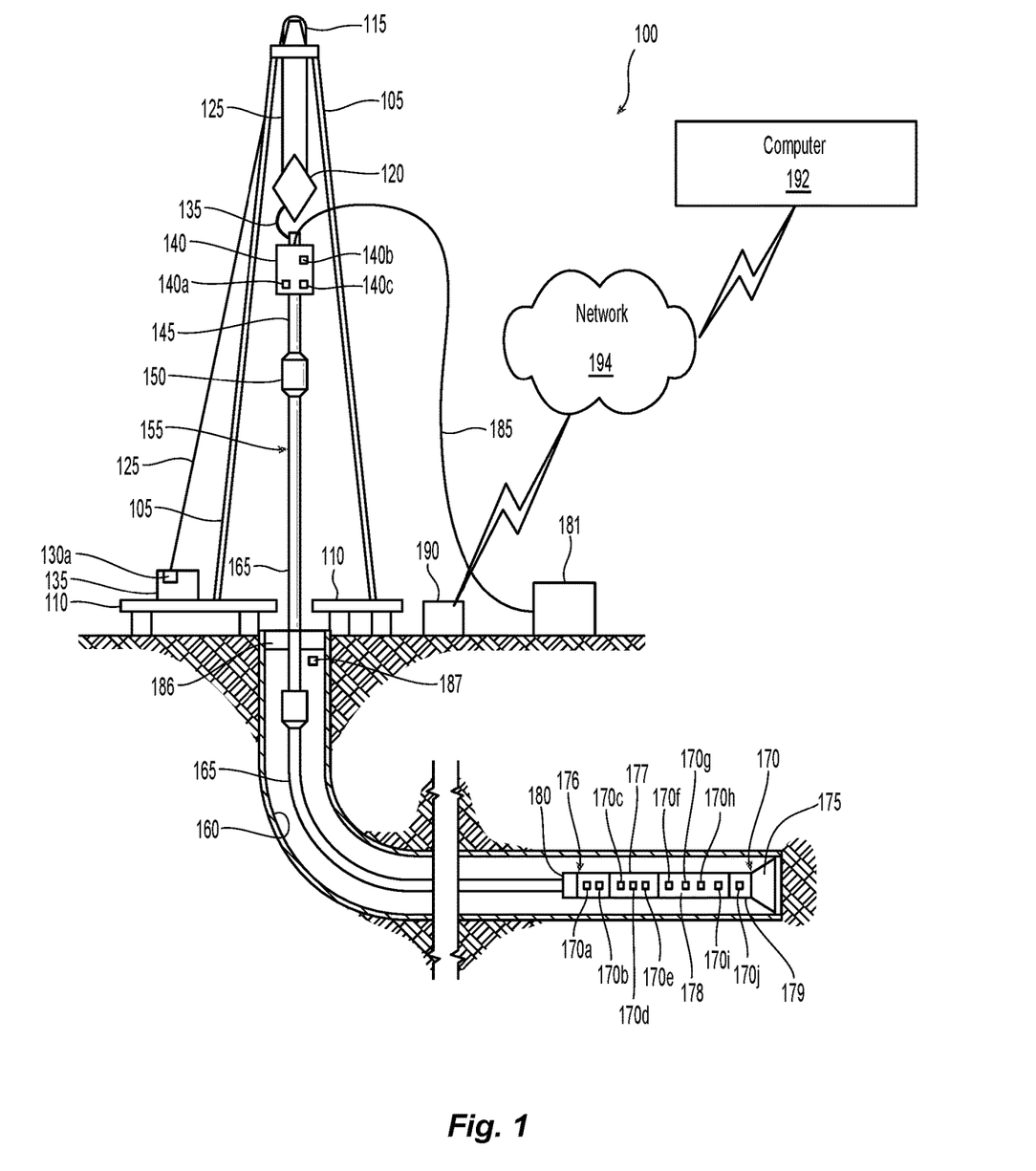
FIG. 1 is a schematic diagram of a drilling rig apparatus that comprises a computer, according to one or more aspects of the present disclosure.

Referring to FIG. 1, illustrated is a schematic view of an apparatus 100 demonstrating one or more aspects of the present disclosure. The apparatus 100 is or includes a land-based drilling rig. However, one or more aspects of the present disclosure are applicable or readily adaptable to any type of drilling rig, such as jack-up rigs, semisubmersibles, drill ships, coil tubing rigs, well service rigs adapted for drilling and/or re-entry operations, and casing drilling rigs, among others within the scope of the present disclosure.

Generally, the apparatus 100 monitors, in real-time, drilling operations relating to a wellbore and optimizes drilling instructions based on the real-time data. As used herein, the term "real-time" is thus meant to encompass close to real-time, such as within about 10 seconds, preferably within about 5 seconds, and more preferably within about 2 seconds. In some embodiments, the term "real-time data" is meant to encompass data that is received during a standard survey and data that is received between a first standard survey and a consecutive, second standard survey.

Apparatus 100 includes a mast 105 supporting lifting gear above a rig floor 110. The lifting gear includes a crown block 115 and a traveling block 120. The crown block 115 is coupled at or near the top of the mast 105, and the traveling block 120 hangs from the crown block 115 by a drilling line 125. One end of the drilling line 125 extends from the lifting gear to draw works 130, which is configured to reel out and reel in the drilling line 125 to cause the traveling block 120 to be lowered and raised relative to the rig floor 110. The draw works 130 may include a rate of penetration ("ROP") sensor 130a, which is configured for detecting an ROP value or range, and a controller to feed-out and/or feed-in of a drilling line 125. The other end of the drilling line 125, known as a dead line anchor, is anchored to a fixed position, possibly near the draw works 130 or elsewhere on the rig.

A hook 135 is attached to the bottom of the traveling block 120. A top drive 140 is suspended from the hook 135. A quill 145, extending from the top drive 140, is attached to a saver sub 150, which is attached to a drill string 155 suspended within a wellbore 160. Alternatively, the quill 145 may be attached to the drill string 155 directly.

The term "quill" as used herein is not limited to a component which directly extends from the top drive, or which is otherwise conventionally referred to as a quill. For example, within the scope of the present disclosure, the "quill" may additionally or alternatively include a main shaft, a drive shaft, an output shaft, and/or another component which transfers torque, position, and/or rotation from the top drive or other rotary driving element to the drill string, at least indirectly. Nonetheless, albeit merely for the sake of clarity and conciseness, these components may be collectively referred to herein as the "quill."

The drill string 155 includes interconnected sections of drill pipe 165 and a BHA 170, which includes a drill bit 175. The BHA 170 may include one or more measurement-while-drilling ("MWD") or wireline conveyed instruments 176, flexible connections 177, optional motors 178, adjustment mechanisms 179 for push-the-bit drilling or bent housing and bent subs for point-the-bit drilling, a controller 180, stabilizers, and/or drill collars, among other components. One or more pumps 181 may deliver drilling fluid to the drill string 155 through a hose or other conduit 185, which may be connected to the top drive 140.

In some embodiments, the downhole MWD or wireline conveyed instruments 176 may be configured for the evaluation of physical properties such as pressure, temperature, torque, weight-on-bit ("WOB"), vibration, inclination, azimuth, toolface orientation in three-dimensional space, and/or other downhole parameters. These measurements may be made downhole, stored in solid-state memory for some time, sent to the controller 180, downloaded from the instrument(s) at the surface, and/or transmitted real-time to the controller 190 at the surface. Data transmission methods may include, for example, digitally encoding data and transmitting the encoded data to the surface, possibly as pressure pulses in the drilling fluid or mud system, acoustic transmission through the drill string 155, electronic transmission through a wireline or wired pipe, and/or transmission as electromagnetic pulses. The MWD tools and/or other portions of the BHA 170 may have the ability to store measurements for later retrieval via wireline and/or when the BHA 170 is tripped out of the wellbore 160. In some embodiments, the weight on bit, differential pressure, etc. are calculated based on sensors located at the surface of the wellbore and/or on the BHA 170.

In an example embodiment, the apparatus 100 may also include a rotating blow-out preventer ("BOP") 186, such as if the wellbore 160 is being drilled utilizing under-balanced or managed-pressure drilling methods. In such embodiment, the annulus mud and cuttings may be pressurized at the surface, with the actual desired flow and pressure possibly being controlled by a choke system, and the fluid and pressure being retained at the well head and directed down the flow line to the choke by the rotating BOP 186. The apparatus 100 may also include a surface casing annular pressure sensor 187 configured to detect the pressure in the annulus defined between, for example, the wellbore 160 (or casing therein) and the drill string 155. It is noted that the meaning of the word "detecting," in the context of the present disclosure, may include detecting, sensing, measuring, calculating, and/or otherwise obtaining data. Similarly, the meaning of the word "detect" in the context of the present disclosure may include detect, sense, measure, calculate, and/or otherwise obtain data.

In the example embodiment depicted in FIG. 1, the top drive 140 is utilized to impart rotary motion to the drill string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

The apparatus 100 may include a downhole annular pressure sensor 170a coupled to or otherwise associated with the BHA 170. The downhole annular pressure sensor 170a may be configured to detect a pressure value or range in the annulus-shaped region defined between the external surface of the BHA 170 and the internal diameter of the wellbore 160, which may also be referred to as the casing pressure, downhole casing pressure, MWD casing pressure, or downhole annular pressure. These measurements may include both static annular pressure (pumps off) and active annular pressure (pumps on).

The apparatus 100 may additionally or alternatively include a shock/vibration sensor 170b that is configured for detecting shock and/or vibration in the BHA 170. The apparatus 100 may additionally or alternatively include a mud motor delta pressure ($\Delta P$) sensor 170c that is configured to detect a pressure differential value or range across the one or more optional motors 178 of the BHA 170. In some embodiments, the mud motor $\Delta P$ may be alternatively or additionally calculated, detected, or otherwise determined at the surface, such as by calculating the difference between the surface standpipe pressure just off-bottom and pressure once the bit 175 touches bottom and starts drilling and experiencing torque. The one or more motors 178 may each be or include a positive displacement drilling motor that uses hydraulic power of the drilling fluid to drive the bit 175, also known as a mud motor. One or more torque sensors, such as a bit torque sensor, may also be included in the BHA 170 for sending data to the controller 190 that is indicative of the torque applied to the bit 175.

The apparatus 100 may additionally or alternatively include a toolface sensor 170e configured to estimate or detect the current toolface orientation or toolface angle. The toolface sensor 170c may be or include a conventional or future-developed gravity toolface sensor which detects toolface orientation relative to the Earth's gravitational field. Alternatively, or additionally, the toolface sensor 170c may be or include a conventional or future-developed magnetic toolface sensor which detects toolface orientation relative to magnetic north or true north. In an example embodiment, a magnetic toolface sensor may detect the current toolface when the end of the wellbore is less than about 7° from vertical, and a gravity toolface sensor may detect the current toolface when the end of the wellbore is greater than about 7° from vertical. However, other toolface sensors may also be utilized within the scope of the present disclosure, including non-magnetic toolface sensors and non-gravitational inclination sensors. The toolface sensor 170c may also, or alternatively, be or include a conventional or future-developed gyro sensor. The apparatus 100 may additionally or alternatively include a WOB sensor 170f integral to the BHA 170 and configured to detect WOB at or near the BHA 170. The apparatus 100 may additionally or alternatively include an inclination sensor 170g integral to the BHA 170 and configured to detect inclination at or near the BHA 170. The apparatus 100 may additionally or alternatively include an azimuth sensor 170h integral to the BHA 170 and configured to detect azimuth at or near the BHA 170. The apparatus 100 may additionally or alternatively include a torque sensor 140a coupled to or otherwise associated with the top drive 140. The torque sensor 140a may alternatively be located in or associated with the BHA 170. The torque sensor 140a may be configured to detect a value or range of the torsion of the quill 145 and/or the drill string 155 (e.g., in response to operational forces acting on the drill string). The top drive 140 may additionally or alternatively include or otherwise be associated with a speed sensor 140b configured to detect a value or range of the rotational speed of the quill 145. In some embodiments, the BHA 170 also includes another directional sensor 170i (e.g., azimuth, inclination, toolface, combination thereof, etc.) that is spaced along the BHA 170 from one or another directional sensor (e.g., the inclination sensor 170g, the azimuth sensor 170h). For example, and in some embodiments, the sensor 170i is positioned in the MWD 176 and another directional sensor is positioned in the adjustment mechanism 179, with a known distance between them, for example 20 feet, configured to estimate or detect the current toolface orientation or toolface angle. The sensors 170a-170j are not limited to the arrangement illustrated in FIG. 1 and may be spaced along the BHA 170 in a variety of configurations.

The top drive 140, the draw works 130, the crown block 115, the traveling block 120, drilling line or dead line anchor may additionally or alternatively include or otherwise be associated with a WOB or hook load sensor 140c (WOB calculated from the hook load sensor that can be based on active and static hook load) (e.g., one or more sensors installed somewhere in the load path mechanisms to detect and calculate WOB, which can vary from rig to rig) different from the WOB sensor 170f. The WOB sensor 140f may be configured to detect a WOB value or range, where such detection may be performed at the top drive 140, the draw works 130, or other component of the apparatus 100. Generally, the hook load sensor 140c detects the load on the hook 135 as it suspends the top drive 140 and the drill string 155.

The detection performed by the sensors described herein may be performed once, continuously, periodically, and/or at random intervals. The detection may be manually triggered by an operator or other person accessing a human-machine interface ("HMI") or GUI, or automatically triggered by, for example, a triggering characteristic or parameter satisfying a predetermined condition (e.g., expiration of a time period, drilling progress reaching a predetermined depth, drill bit usage reaching a predetermined amount, etc.). Such sensors and/or other detection means may include one or more interfaces which may be local at the well/rig site or located at another, remote location with a network link to the system.

The apparatus 100 also includes the controller 190, which is or forms a portion of a computing system, configured to control or assist in the control of one or more components of the apparatus 100. For example, the controller 190 may be configured to transmit operational control signals to the draw works 130, the top drive 140, the BHA 170 and/or the pump 181. The controller 190 may be a stand-alone component installed near the mast 105 and/or other components of the apparatus 100. In an example embodiment, the controller 190 includes one or more systems located in a control room proximate the mast 105, such as the general-purpose shelter often referred to as the "doghouse" serving as a combination tool shed, office, communications center, and general meeting place. The controller 190 may be configured to transmit the operational control signals to the draw works 130, the top drive 140, the BHA 170, and/or the pump 181 via wired or wireless transmission means which, for the sake of clarity, are not depicted in FIG. 1.

In some embodiments, the controller 190 is not operably coupled to the top drive 140, but instead may include other drive systems, such as a power swivel, a rotary table, a coiled tubing unit, a downhole motor, and/or a conventional rotary rig, among others.

In some embodiments, the controller 190 controls the flow rate and/or pressure of the output of the mud pump 181.

In some embodiments, the controller 190 controls the feed-out and/or feed-in of the drilling line 125, rotational control of the draw works (in v. out) to control the height or position of the hook 135 and may also control the rate the hook 135 ascends or descends. However, example embodiments within the scope of the present disclosure include those in which the draw-works-drill-string-feed-off system may alternatively be a hydraulic ram or rack and pinion type hoisting system rig, where the movement of the drill string 155 up and down is via something other than the draw works 130. The drill string 155 may also take the form of coiled tubing, in which case the movement of the drill string 155 in and out of the hole is controlled by an injector head which grips and pushes/pulls the tubing in/out of the hole. Nonetheless, such embodiments may still include a version of the draw works controller, which may still be configured to control feed-out and/or feed-in of the drill string 155.

Generally, the apparatus 100 also includes a hook position sensor that is configured to detect the vertical position of the hook 135, the top drive 140, and/or the travelling block 120. The hook position sensor may be coupled to, or be included in, the top drive 140, the draw works 130, the crown block 115, and/or the traveling block 120 (e.g., one or more sensors installed somewhere in the load path mechanisms to detect and calculate the vertical position of the top drive 140, the travelling block 120, and the hook 135, which can vary from rig to rig). The hook position sensor is configured to detect the vertical distance the drill string 155 is raised and lowered, relative to the crown block 115. In some embodiments, the hook position sensor is a draw works encoder, which may be the ROP sensor 130a. In some embodiments, the apparatus 100 also includes a rotary rotations per minute ("RPM") sensor that is configured to detect the rotary RPM of the drill string 155. This may be measured at the top drive 140 or elsewhere, such as at surface portion of the drill string 155. In some embodiments, the apparatus 100 also includes a quill position sensor that is configured to detect a value or range of the rotational position of the quill 145, such as relative to true north or another stationary reference. In some embodiments, the apparatus 100 also includes a pump pressure sensor that is configured to detect the pressure of mud or fluid that powers the BHA 170 at the surface or near the surface. In some embodiments, the apparatus also includes sensors that are configured to monitors affects the MSE, which represents the amount of energy required per unit volume of drilled rock. In some embodiments, the MSE is not directly sensed, but is calculated based on sensed data at the controller 190 or other controller. In some embodiments, the apparatus 100 also includes a bit depth sensor that detects the depth of the bit 175.

In some embodiments, the apparatus 100 also includes a computer 192 or is at least configured to communicate with the computer 192 via a network 194. In some embodiments, the computer 192 and the controller 190 form the computing system even if the computer 192 and the controller 190 are remote or spaced from each other.

Figure 2:
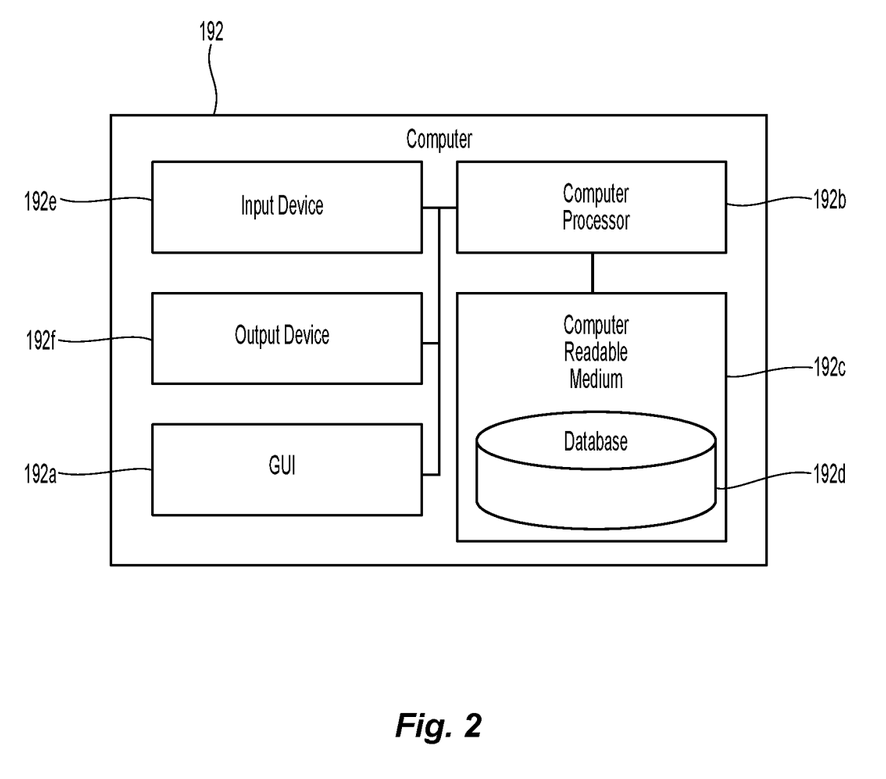
FIG. 2 is a diagrammatic illustration of the computer of FIG. 1, according to one or more aspects of the present disclosure.

In an example embodiment, as illustrated in FIG. 2 with continuing reference to FIG. 1, the computer 192 includes a GUI 192a, computer processor 192b and a computer readable medium 192c operably coupled thereto. Instructions accessible to, and executable by, the computer processor 192b are stored on the computer readable medium 192c. A database 192d is also stored in the computer readable medium 192c. Generally, the GUI 192a can display a plurality of windows or screens to the user. The computer 192 also includes an input device 192e and an output device 192f. In some embodiments, the input device 192e and the output device 192f are the GUI 192a. In some embodiments, the user provides inputs to the system 10 via a window that is displayed on the GUI 192a. However, the input device 192e can also be a microphone in some embodiments and the output device 192f is a speaker. In several example embodiments, the computer 192 is, or includes, a telephone, a personal computer, a personal digital assistant, a cellular telephone or mobile phone, other types of telecommunications devices, other types of computing devices, and/or any combination thereof.

Figure 3:
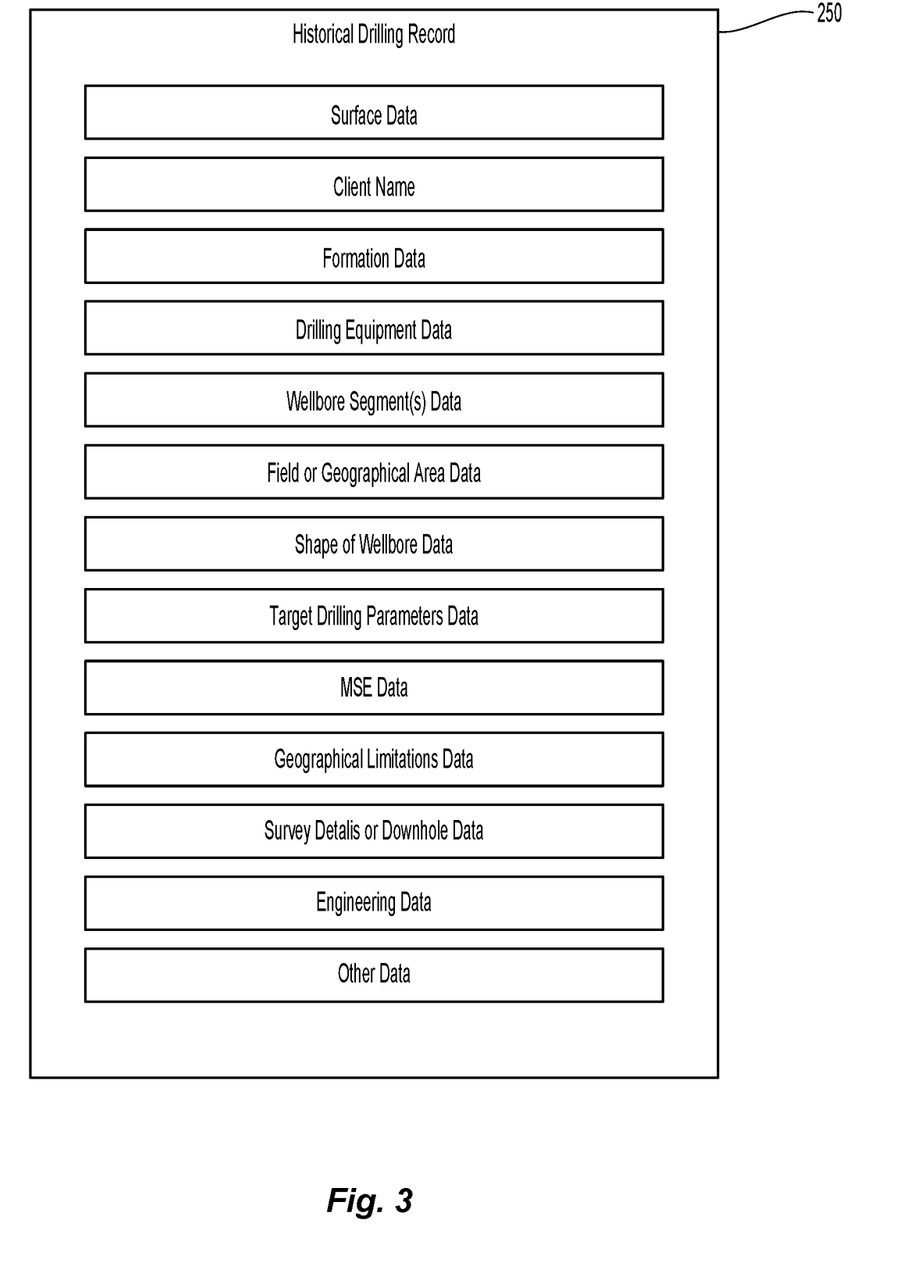
FIG. 3 is a listing of historical data forming a portion of a historical drilling record, according to one or more aspects of the present disclosure.

In some embodiments, the database 192d stores a plurality of historical drilling records, or the computer 192 is otherwise able to access the plurality of historical drilling records. In some embodiments and as illustrated in FIG. 3, a historical drilling record 250 includes data obtained before and during drilling of a wellbore. In some embodiments, the data includes a calculated surface MSE and a calculated downhole MSE, but in other embodiments only the data need to calculate the surface and downhole MSE is included in the historical drilling record 250. Generally, a historical drilling record includes historical data upon which the delta MSE is calculated for a given depth of the wellbore. In some embodiments, the historical drilling record 250 includes data relating to a delta MSE, which is the difference between the surface and downhole MSE. That is and, in some embodiments, the delta MSE is represented using the following expression:

$$\Delta MSE = MSE_{surface} - MSE_{downhole} \quad (1)$$

Generally, the surface MSE is calculated using surface inputs, such as for example surface-measured torque, WOB, and/or ROP. In some embodiments, the surface MSE is represented using the following expression:

$$MSE_{surface} = ((WOB_{surface}/\text{Area}) + ((2\pi * \text{Torque}_{surface} * RPM_{surface})/(\text{Area}*ROP)) \quad (2)$$

In some embodiments, the downhole MSE is represented using the following expression:

$$MSE_{downhole} = ((WOB_{downhole}/\text{Area}) + ((2\pi * \text{Torque at the bit} * RPM_{downhole})/(\text{Area}*ROP)) \quad (3)$$

However, other equations or expressions may be used to calculate the MSE. In some embodiments, the delta MSE reflects the energy transfer from the surface to downhole (e.g., to the BHA). In some embodiments and when associated with the delta MSE, the term "surface" is associated with the top drive 140 but can be associated with other types of driving systems. In some embodiments, the historical drilling record 250 may include surface data monitored or tracked during the drilling of a wellbore; client name data associated with the wellbore; formation data (expected and encountered) associated with the wellbore; drilling equipment data associated with the drilling of the wellbore; wellbore segment(s) data; field or geographical area data associated with the field or geographical area in which the wellbore was drilled; shape of the wellbore data (i.e., straight or vertical, L-shape, S-shape, etc.); target drilling parameters data associated with the target drilling parameters used during the drilling of the wellbore; MSE Data, such as the downhole MSE, the surface MSE, and/or the delta MSE during the drilling of the wellbore; geographical limitations data associated with the drilling of the wellbore; survey details or downhole data obtained during the drilling of the wellbore; engineering data; and other data. Generally, each historical drilling record provides data regarding distinctive characteristics for the wellbore that include or are based on: the client name associated with the wellbore, the formation data (expected and encountered) associated with the wellbore, the drilling equipment associated with the drilling of the wellbore, the type of wellbore segments that form the wellbore, the field or geographical area in which the wellbore was drilled, the shape of the wellbore (i.e., straight or vertical, L-shape, S-shape, etc.), the target drilling parameters used during the drilling of the wellbore, any geographical limitations associated with the drilling of the wellbore, the survey details or downhole data obtained during the drilling of the wellbore, engineering data, and other data.

In an example embodiment, the network 194 includes the Internet, one or more local area networks, one or more wide area networks, one or more cellular networks, one or more wireless networks, one or more voice networks, one or more data networks, one or more communication systems, and/or any combination thereof.

Figure 4:
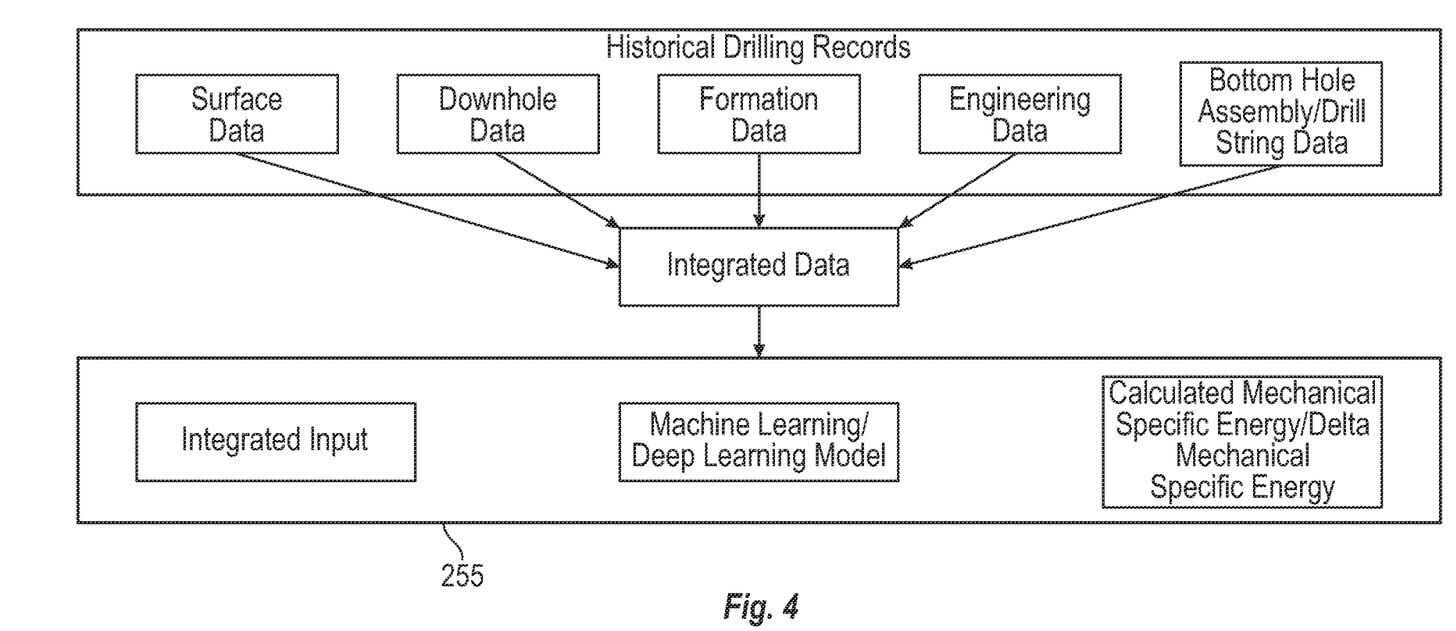
FIG. 4 is a diagrammatic illustration of a data flow of the apparatus of FIG. 1, according to one or more aspects of the present disclosure.

FIG. 4 is a diagrammatic illustration of a data flow involving at least a portion of the apparatus 100 according to one embodiment. Generally, the computer 192 includes a machine learning or deep learning module 255 that integrates data from the plurality of historical drilling records and uses that integrated data to develop and train a machine learning model that calculates a mathematical equation representing delta MSE. In some embodiments, the deep learning module 255 provides an output that is a mathematical approximation detailing a relationship between parameters and the delta MSE. In some embodiments, the module 255 includes a deep learning architecture such as deep neural networks. In some embodiments, the machine learning model is or includes neural networks.

Figure 5:
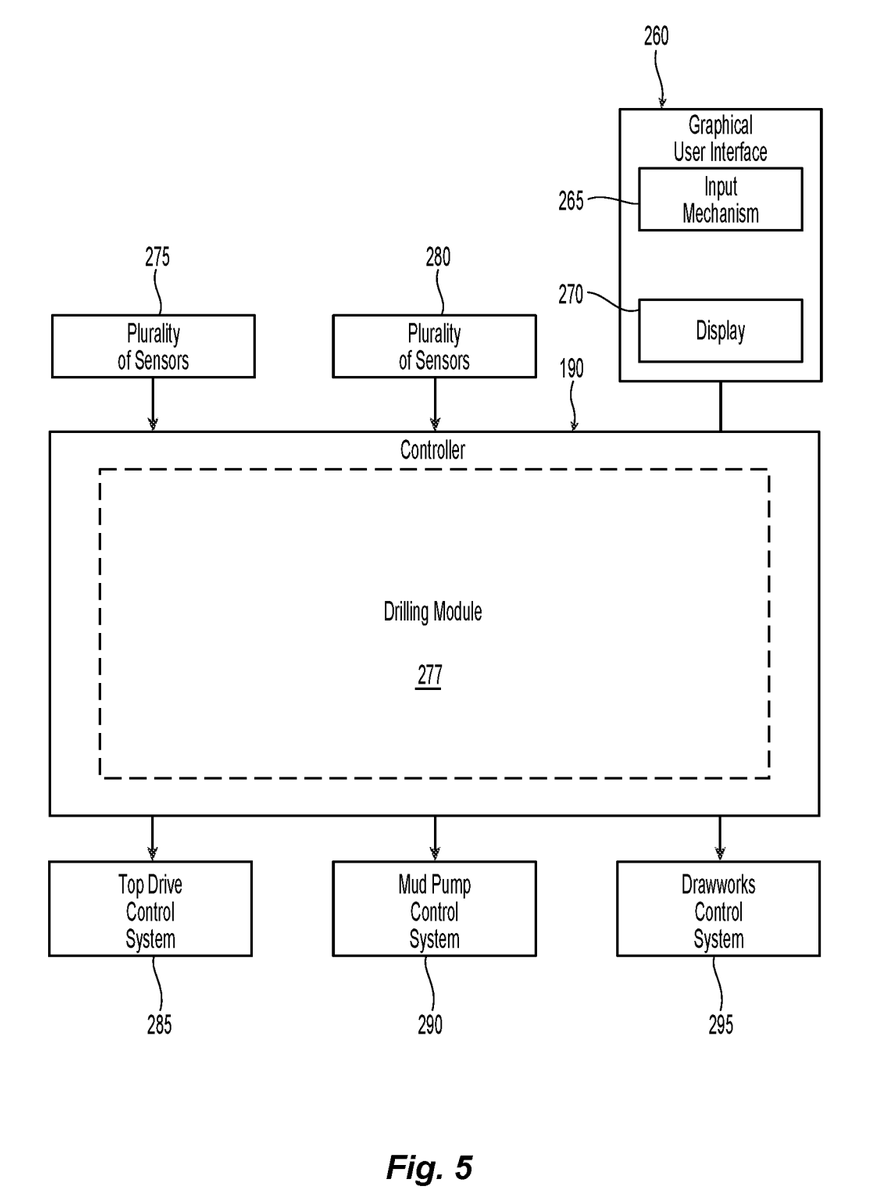
FIG. 5 is a schematic illustration of a portion of the apparatus of FIG. 1, according to one or more aspects of the present disclosure.

FIG. 5 is a diagrammatic illustration of a data flow involving at least a portion of the apparatus 100 according to one embodiment. Generally, the controller 190 is operably coupled to or includes a GUI 260. The GUI 260 includes an input mechanism 265 for user-inputs or drilling parameters. The input mechanism 265 may include a touch-screen, keypad, voice-recognition apparatus, dial, button, switch, slide selector, toggle, joystick, mouse, data base and/or other conventional or future-developed data input device. Such input mechanism 265 may support data input from local and/or remote locations. Alternatively, or additionally, the input mechanism 265 may include means for user-selection of input parameters, such as predetermined toolface set point values or ranges, such as via one or more drop-down menus, input windows, etc. In general, the input mechanism 265 and/or other components within the scope of the present disclosure support operation and/or monitoring from stations on the rig site as well as one or more remote locations with a communications link to the system, network, local area network ("LAN"), wide area network ("WAN"), Internet, satellite-link, and/or radio, among other means. The GUI 260 may also include a display 270 for visually presenting information to the user in textual, graphic, or video form. The display 270 may also be utilized by the user to input the input parameters in conjunction with the input mechanism 265. For example, the input mechanism 265 may be integral to or otherwise communicably coupled with the display 270. The GUI 260 and the controller 190 may be discrete components that are interconnected via wired or wireless means. Alternatively, the GUI 260 and the controller 190 may be integral components of a single system or controller. The controller 190 is configured to receive electronic signals via wired or wireless transmission means (also not shown in FIG. 1) from a plurality of sensors 275 included in the apparatus 100, where each sensor is configured to detect an operational characteristic or parameter. The controller 190 also includes a drilling module 277 to control a drilling operation. The drilling module 277 may include a variety of sub modules, with each of the sub modules being associated with a predetermined workflow or recipe that executes a task from beginning to end. Often, the predetermined workflow includes a set of computer-implemented instructions for executing the task from beginning to end, with the task being one that includes a repeatable sequence of steps that take place to implement the task. In some embodiments, the drilling module 277 receives the data from the plurality of sensors 275, calculates a delta MSE based on the received data, and then optimizes drilling parameters using the mathematical approximation that is output from the module 255 and the calculated delta MSE. In some embodiments, the drilling module 277 also generates instructions based on the optimized drilling parameters and implements the instructions to drill the wellbore 160. In some embodiments, the controller 190 is configured to receive a plurality of inputs 280 from a user via the input mechanism 265, look up a plurality of inputs from a database, and/or generate new optimized drilling parameters using the mathematical approximation provided by the computer 192.

In some embodiments, the controller 190 is also operably coupled to a top drive control system 285, a mud pump control system 290, and a draw works control system 295, and is configured to send signals to each of the control systems 285, 290, and 295 to control the operation of the top drive 140, the mud pump 181, and the draw works 130. However, in other embodiments, the controller 190 includes each of the control systems 285, 290, and 295 and thus sends signals to each of the top drive 140, the mud pump 181, and the draw works 130.

In some embodiments, the top drive control system 285 includes the top drive 140, the speed sensor 140$b$, the torque sensor 140$a$, and the hook load sensor 140$c$. The top drive control system 285 is not required to include the top drive 140, but instead may include other drive systems, such as a power swivel, a rotary table, a coiled tubing unit, a downhole motor, and/or a conventional rotary rig, among others.

In some embodiments, the mud pump control system 290 includes a mud pump controller and/or other means for controlling the flow rate and/or pressure of the output of the mud pump 181.

In some embodiments, the draw works control system 295 includes the draw works controller and/or other means for controlling the feed-out and/or feed-in of the drilling line 125. Such control may include rotational control of the draw works (in v. out) to control the height or position of the hook 135 and may also include control of the rate the hook 135 ascends or descends. However, example embodiments within the scope of the present disclosure include those in which the draw works-drill-string-feed-off system may alternatively be a hydraulic ram or rack and pinion type hoisting system rig, where the movement of the drill string 155 up and down is via something other than the draw works 130. The drill string 155 may also take the form of coiled tubing, in which case the movement of the drill string 155 in and out of the hole is controlled by an injector head which grips and pushes/pulls the tubing in/out of the hole. Nonetheless, such embodiments may still include a version of the draw works controller, which may still be configured to control feed-out and/or feed-in of the drill string.

The plurality of sensors 275 may include the ROP sensor 130$a$; the torque sensor 140$a$; the quill speed sensor 140$b$; the hook load sensor 140$c$; the surface casing annular pressure sensor 187; the downhole annular pressure sensor 170$a$; the shock/vibration sensor 170$b$; the toolface sensor 170$c$; the MWD WOB sensor 170$d$; the mud motor delta pressure sensor; the bit torque sensor 172$b$; the hook position sensor; a rotary RPM sensor; a quill position sensor; a pump pressure sensor; a MSE sensor; a bit depth sensor; and any variation thereof. The data detected by any of the sensors in the plurality of sensors 275 may be sent via electronic signal to the controller 190 via wired or wireless transmission. The functions of the sensors 130$a$, 140$a$, 140$b$, 140$c$, 187, 170$a$, 170$b$, 170$c$, 170$d$, 172$a$, and 172$b$ are discussed above and will not be repeated here.

Generally, the rotary RPM sensor is configured to detect the rotary RPM of the drill string 155. This may be measured at the top drive 140 or elsewhere, such as at surface portion of the drill string 155.

Generally, the quill position sensor is configured to detect a value or range of the rotational position of the quill 145, such as relative to true north or another stationary reference.

Generally, the pump pressure sensor is configured to detect the pressure of mud or fluid that powers the BHA 170 at the surface or near the surface.

Generally, the MSE sensor is configured to detect the MSE representing the amount of energy required per unit volume of drilled rock. In some embodiments, the MSE is not directly sensed, but is calculated based on sensed data at the controller 190 or other controller.

Generally, the bit depth sensor detects the depth of the bit 175.

In some embodiments the top drive control system 285 includes the torque sensor 140a, the quill position sensor, the hook load sensor 140c, the pump pressure sensor, the MSE sensor, and the rotary RPM sensor, and a controller and/or other means for controlling the rotational position, speed and direction of the quill or other drill string component coupled to the drive system (such as the quill 145 shown in FIG. 1). The top drive control system 285 is configured to receive a top drive control signal from the drilling module 277, if not also from other components of the apparatus 100. The top drive control signal directs the position (e.g., azimuth), spin direction, spin rate, and/or oscillation of the quill 145.

In some embodiments, the draw works control system 295 comprises the hook position sensor, the ROP sensor 130a, and the draw works controller and/or other means for controlling the length of drilling line 125 to be fed-out and/or fed-in and the speed at which the drilling line 125 is to be fed-out and/or fed-in.

In some embodiments, the mud pump control system 290 comprises the pump pressure sensor and the motor delta pressure sensor 172a.

Figure 6:
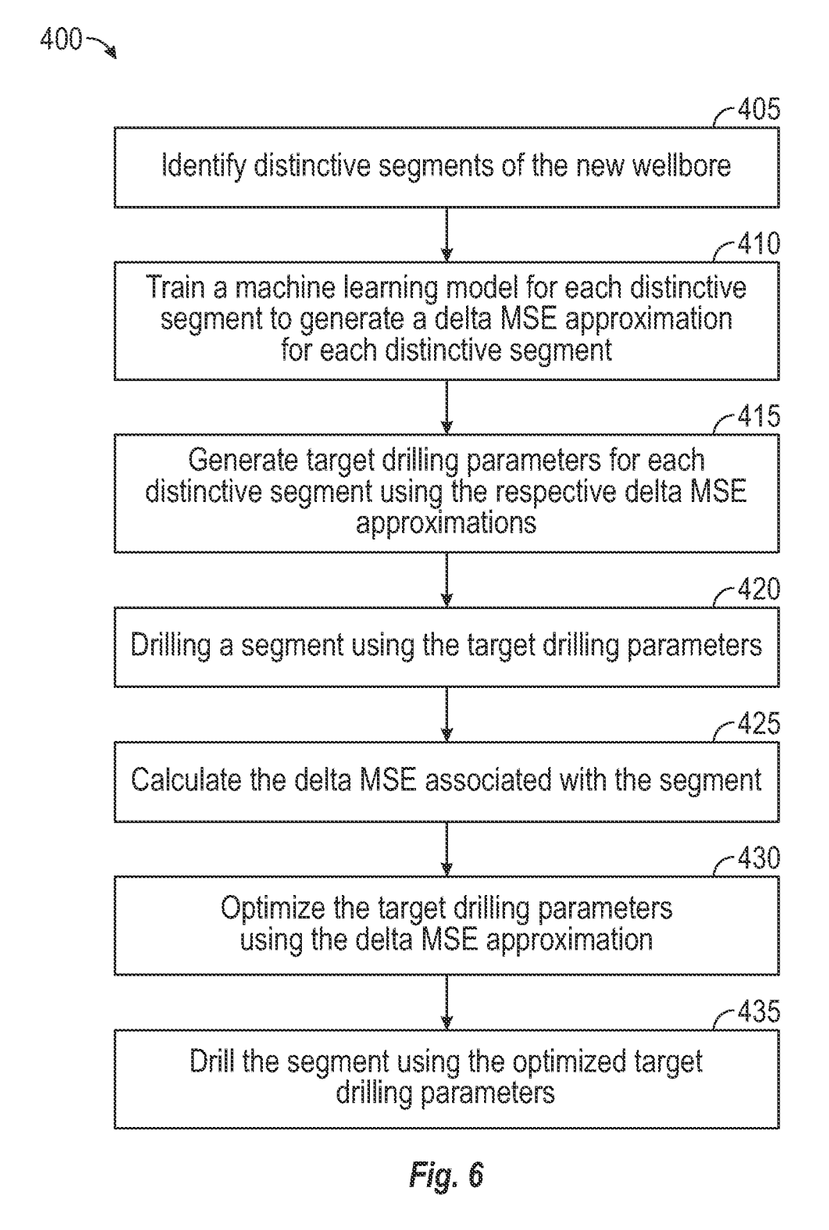
FIG. 6 is a flow-chart diagram of a method according to one or more aspects of the present disclosure.

In an example embodiment, as illustrated in FIG. 6 with continuing reference to FIGS. 1-5, a method 400 of operating the apparatus 100 includes identifying distinctive segments of the planned wellbore at step 405; training a machine learning model for each distinctive segment to generate a delta MSE approximation for each distinctive segment at step 410; generating target drilling parameters for each distinctive segment using the respective delta MSE approximations at step 415; drilling a segment of the planned wellbore using the target drilling parameters at step 420; calculating the delta MSE associated with the drilled segment at step 425; optimizing the target drilling parameters using the delta MSE approximation at step 430; drilling the segment using the optimized target drilling parameters at step 435; and repeating the steps 420-435 for each distinctive segment.

Figure 7:
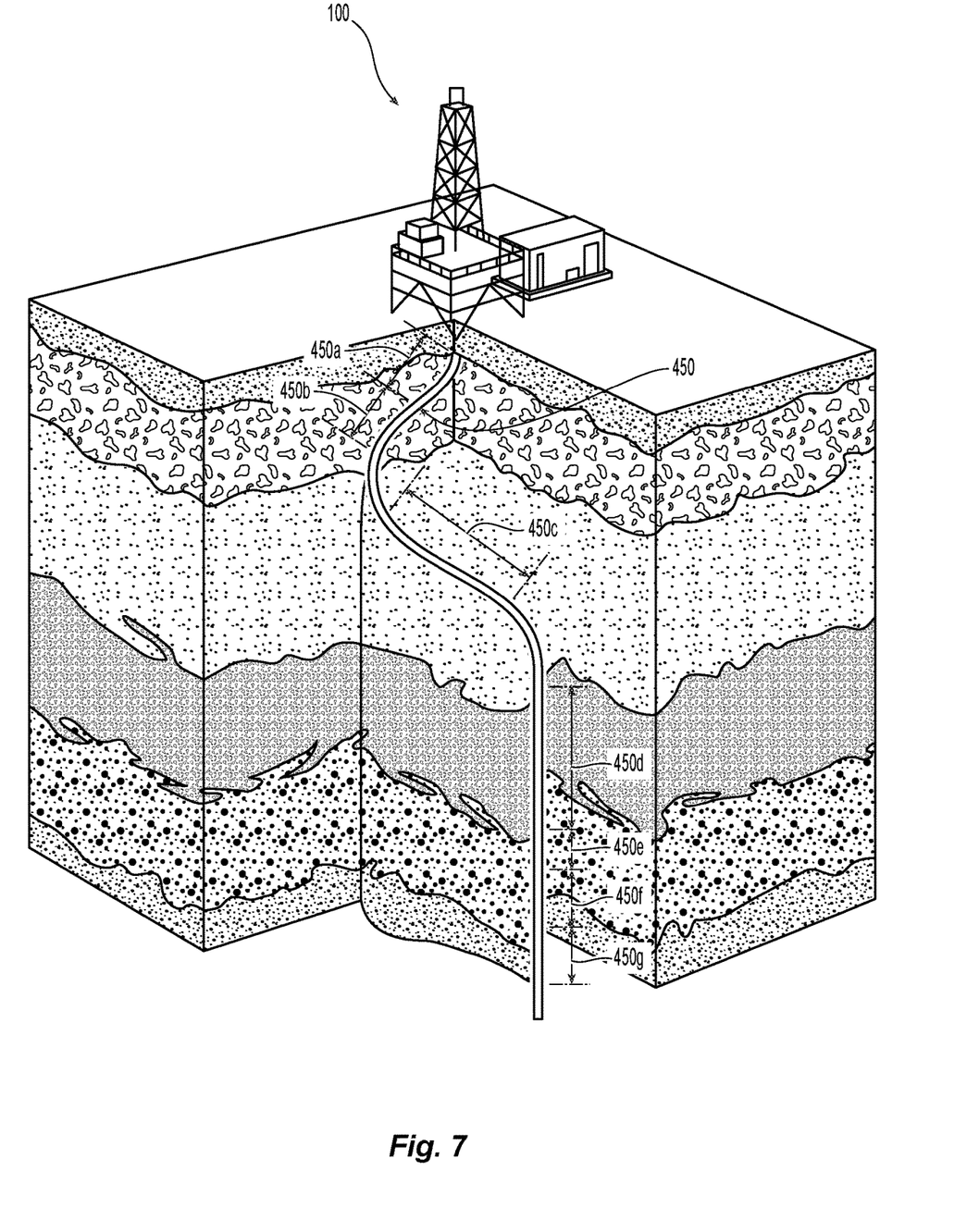
FIG. 7 is a diagrammatic illustration of a planned wellbore, according to one or more aspects of the present disclosure.

At the step 405, distinctive segments of the new planned wellbore are identified. In some embodiments and as illustrated in FIG. 7, the new planned wellbore 450 can be composed of a plurality of distinctive segments. However, in other embodiments the entirety of the new planned wellbore 450 is considered one distinctive segment. As illustrated, the planned wellbore 450 includes a first segment 450a, a second segment 450b, a third segment 450c, a fourth segment 450d, a fifth segment 450e, a sixth segment 450f, and a seventh segment 450g. Each of the segments 450a-450g include distinctive characteristics that distinguish it from other segments of the planned wellbore. In some embodiments, the distinctive characteristics associated with each segment are shared by some, but not all, historical wellbores. That is, in some instances the distinctive characteristics of the segments 450a-450f are the same or substantially the same as the distinctive characteristics from other, historical wellbores. In some embodiments, each of the segments 450a-450g are associated with a client name, expected formation data, expected drilling equipment, wellbore segment (e.g., size of expected wellbore or type of wellbore such as ream wellbore), a field or geographical area, a shape of the wellbore (e.g., straight, s-shaped), geographical limitations such as surrounding wells, expected engineering data, and other data. In some embodiments, the computer 192 receives a well plan associated with the planned wellbore and then identifies the segments based on the information contained in the well plan. However, in other embodiments, a user identifies the segments and provides information regarding the segments to the computer 192.

As used herein, the term "substantially the same" can be understood to mean similar historical conditions likely to lead to the same result in the present, e.g., based on a similar geologic formation and the same drilling conditions or the same geologic formation and similar drilling conditions, or the like. In the event the above wording is insufficiently precise, the term "similar," "similar to," or "substantially the same" could also be understood herein to mean current numerical values that are up to about ten percent (10%) above or below the historical data, or historical data which are up to about ten percent (10%) above or below the current condition.

At the step 410, a machine learning model is trained—for each distinctive segment—to generate an approximation of delta MSE. In some embodiments, the module 255 trains the machine learning model for each distinctive segment. Generally, the computer 192 identifies historical records that include segments with similar or identical distinctive segments. These similar segments are then used as inputs to train the machine learning model. In some embodiments, the machine learning model derives a mathematical approximation or function for energy transfer, or the delta MSE, using the deep neural networks. Various architectures available within deep learning framework can be used to derive the approximation. In some embodiments, the mathematical function is derived out of a neural network and is a blackbox function. In some embodiments, the output of the machine learning model is a mathematical function that includes a set of drilling parameters or optimization parameters and the relationship between the set of parameters and the delta MSE. In some embodiments, the mathematical approximation is an equation that is illustrated below:

$$a_1x_1 + a_2x_2 + a_3x_3 + a_4x_4 + \ldots a_nx_n = \Delta MSE \quad (4)$$

Where:

$x_i$ represents various input parameters such as drilling parameters (e.g., WOB, RPM, standpipe pressure, torque, mud weight, rate of penetration ("ROP")); field and formation data (e.g., field name, gamma ray, formation details); drill string and BHA data (e.g., bit type, mud motor/RSS details); and survey details (e.g., inclination and azimuth); and $a_i$ is a coefficient or correlation between various input parameters.

Generally, the equation is specific to each distinctive wellbore segment and thus the equation for the segment 450a is different from the equations for the segments 450b, 450c, etc.

At the step 415, target drilling parameters are generated for each distinctive segment using the respective delta MSE approximation or equation. In some embodiments and using the equation generated by the module 255, the computer 192 generates target drilling parameters for each distinctive segment. In some embodiments, values of the target drilling parameters are estimated at the step 415. As such, in some embodiments target values for the input parameters, or optimization parameters, present in the mathematical approximation.

Generally, the well program and the target drilling parameters are stored in, or accessible to, the controller 190 so that the controller 190 is capable of comparing the target drilling parameters with measured drilling parameters. Using the target drilling parameters, drilling instructions are generated by the drilling module 277. However, in other embodiments the drilling instructions are generated by the computer 192.

Regardless, the drilling instructions are referenced by the drilling module 277 and/or the drilling operator when the wellbore 160 is drilled.

At the step 420, a segment of the planned wellbore is drilled using the target drilling parameters and/or the drilling instructions. Generally, the drilling module 277 drills a portion of the segment using the target drilling parameters identified at the step 415 and/or the drilling instructions that are based on the target drilling parameters by controlling the control systems 285, 290, and 295. A portion of a segment of the wellbore may include a period of time (e.g., 30 seconds, 1 minute, 2 minutes), a depth, a depth interval (e.g., every 5 feet, a depth interval determined by a period of time, every 90 ft. or other distance associated with adding a stand to the working string), or combination thereof. Generally, the target drilling parameters form a portion of drilling instructions and the step 420 includes executing the drilling instructions. Generally, the drilling instructions are instructions related to any drilling operation, including the length and direction of a slide, the timing for tripping out the BHA 170, the target WOB, the target ROP, the target number of wraps in each direction during oscillation of the drill string 155, etc. That is, the drilling instructions are not limited to instructions to drill, but also include instructions for activities before and after drilling. In some embodiments, the drilling instructions include the target drilling parameters, which are set points, such as a ROP set point ("SP"), WOB SP, and a differential pressure SP.

At the step 425, the delta MSE is calculated. Generally, the drilling module 277 monitors drilling operations using the data from the BHA 170 and/or the plurality of sensors 275 and calculates the delta MSE using the monitored data.

At the step 430, the target drilling parameters are optimized using the MSE approximation. Generally, the controller 190 uses the mathematical approximation for the segment of the wellbore being drilled and optimizes the target drilling parameters based on the calculated delta MSE and the mathematical approximation. In some embodiments, the target drilling parameters include WOB, RPM, etc. In some embodiments and during the step 415, the target values of the input parameters present in the relevant mathematical approximation are optimized or otherwise changed to reduce the delta MSE. In some embodiments, the target drilling parameters are optimized in real time or near real time. In some embodiments, the drilling module 277 optimizes the target drilling parameters using a Bayesian optimization technique. Generally, Bayesian optimization techniques attempt to find global optimum values in minimum number of steps. In some embodiments, the steps involved in an Bayesian optimization include creating a surrogate model based on probability P*(delta energy transfer Model/Drilling Parameters) and conducting evaluations of this surrogate model. As the number of evaluations increases, surrogate model evaluations match with the true function, and therefore, if the drilling parameters are selected that optimizes surrogate function, it will optimize the true function of delta energy transfer. However, in some embodiments, other types of sequential design strategy optimization family methods that do not require derivatives are used during the step 430. In some embodiments, modified instructions are generated based on the optimized drilling parameters. In some embodiments, the modified instructions are generated automatically by the drilling module 277. For example, the drilling module 277 generates modified instructions that update the set points of the ROP, WOB, increase or decrease the mud motor delta pressure or differential pressure, etc. When the BHA 170 is sliding, then the drilling module 277 generates modified instructions that update the target oscillation parameters (e.g., wraps of the drill pipe in one direction and another) to maintain toolface position and/or change toolface position, increase or decrease slide target distance, increase or decrease the mud motor delta pressure, increase or decrease WOB, etc. That is, the drilling module 277 uses the data received via the BHA 170 and the mathematical approximation to optimize and change the drilling instructions thereby forming a closed loop system.

At the step 435, the segment of the planned wellbore is drilled using the optimized target drilling parameters. Generally, the step 435 is substantially similar to the step 425 except that the drilling module 277 drills the segment using the optimized target drilling parameters. In some embodiments, the drilling module 277, along with the top drive controller system 285, the mud pump control system 290, and the draw works control system 295 automatically execute the modified instructions without, or with very little, user interaction. However, in other embodiments the drilling module 277 presents the optimized target drilling parameters and any associated drilling instructions to the user via the GUI 260 for the user to implement.

Generally, the method 400 also includes repeating the steps 420-435 for each distinctive segment before moving to the next distinctive segment.

In some embodiments, the steps 420, 425, 430, and 435 occur between a first and second consecutive standard static survey. Conventionally, a standard static survey is conducted at each drill pipe connection to obtain an accurate measurement of inclination and azimuth for the new survey position, while continuous data is data received from the BHA 170 between standard static surveys. As such, the apparatus 100 can monitor drilling operations without having to wait for the next standard static survey. Moreover, the apparatus 100 can alter instructions regarding the drilling operation in response to the progress of the drilling operation. In some embodiments, the steps 420, 425, 430, and 435 occur after a first stand of drill pipe is added to the drill string 155 and before a second consecutive stand of drill pipe is coupled to the drill string 155. In some embodiments, the optimization of the drilling parameters occurs in real-time. That is, the optimization of the drilling parameters occurs without a significant delay once drilling data is received at the surface. For example, in some embodiments there is a delay between when data is gathered—at the BHA—and when the data is received at the surface. Once received at the surface, the data is shared in real-time with the drilling module 277. In other words, real-time indicates processing of data at the drilling module 277 within minutes and/or seconds after receipt of drilling data.

In some embodiments, the apparatus 100 and the method 400 differ from an apparatus and method for optimizing the ROP during drilling of a wellbore because increasing or maximizing the ROP during drilling can result in a delta MSE that is suboptimal. Moreover, maximizing ROP can result in an increased delta MSE and/or equipment failure, which can cause extended drilling delays. While the ROP can be maximized during the time in which the apparatus 100 is drilling, a focus on ROP alone does not account for delays in drilling due to inefficient energy transfer (i.e., high delta MSE). Often, inefficient energy transfer is caused by vibration, etc., and maximizing the ROP does not prevent or address this issue or others. As such, maximizing ROP is a simpler mathematical equation to calculate. Moreover, conventionally, any mathematical equation regarding the maximization of ROP include the same parameters among segments with the wellbore.

Using the apparatus 100 and/or the method 400 optimizes the energy transfer from the surface to the BHA, which also reduces vibration in the drillstring, etc. and preserves equipment integrity.

In some embodiments, the apparatus 100 provides an alert that the model should be retrained. That is, when the drilling operation does not respond to the optimization attempts using the equation or the approximation, then the drilling module 277 provides an alert that the equation or approximation may need to be updated or replaced with another equation. In some embodiments, the equation is refined during the drilling operation in addition to the drilling parameters being optimized.

Using the apparatus 100 and/or the method 400, the target drilling parameters and associated drilling instructions are optimized in real time. When the instructions being followed are not optimal, the drilling module 277 generated modified instructions. That is, the apparatus 100 and/or the method 400 optimizes the instructions, which optimize the delta MSE.

In some embodiments, the use of the apparatus 100 and/or implementation of the method 400 removes or reduces the number of subjective decisions, which are made by the user or drilling operator when the user relies on previous experiences in order to attempt optimizing the delta MSE.

In some embodiments, the apparatus 100 receives the planned well plan, identifies the segments, and then selects the historical drilling records that include similar segments. In other embodiments, a user identifies the historical drilling records that include similar segments. In other embodiments, the historical drilling records are classified by distinctive characteristics and the apparatus 100 receives a user input selecting one or more of the distinctive characteristics.

Methods within the scope of the present disclosure may be local or remote in nature. These methods, and any controllers discussed herein, may be achieved by one or more intelligent adaptive controllers, programmable logic controllers, artificial neural networks, and/or other adaptive and/or "learning" controllers or processing apparatus. For example, such methods may be deployed or performed via PLC, PAC, PC, one or more servers, desktops, handhelds, and/or any other form or type of computing device with appropriate capability.

The term "about," as used herein, should generally be understood to refer to both numbers in a range of numerals. For example, "about 1 to 2" should be understood as "about 1 to about 2." Moreover, all numerical ranges herein should be understood to include each whole integer, or ⅒ of an integer, within the range.

The phrase "at least one of A and B" should be understood to mean "A, B, or both A and B." The phrase "one or more of the following: A, B, and C" should be understood to mean "A, B, C, A and B, B and C, A and C, or all three of A, B, and C." The phrase "one or more of A, B, and C" should be understood to mean "A, B, C, A and B, B and C, A and C, or all three of A, B, and C."

Thus, a method of drilling a first segment of a wellbore that has a first set of distinctive characteristics has been described. Embodiments of the method may generally include: training, using a computing system, a first machine learning model using a first plurality of historical wellbore drilling records; wherein each of the historical wellbore drilling records of the first plurality of historical wellbore drilling records comprises historical data obtained during drilling of a wellbore and upon which a delta mechanical specific energy ("MSE") is calculated for a given depth of the wellbore; wherein the delta MSE is a difference between a surface MSE and a bottom hole assembly ("BHA") MSE for the given depth; wherein each of the wellbores associated with the first plurality of historical wellbore drilling records has the first set of distinctive characteristics; and wherein an output of the first machine learning model is a first mathematical expression representing a relationship between a first set of optimization parameters and the delta MSE when drilling a wellbore that has the first set of distinctive characteristics; generating, using the computing system and based on the first mathematical expression, first target values for the first set of optimization parameters for drilling of the wellbore; drilling a first portion of the first segment of the wellbore using the first target values for the first set of optimization parameters; monitoring, using the computing system, drilling parameters during the drilling of the first segment of the wellbore; calculating, based on the monitored drilling parameters and using the computing system, the delta MSE associated with the first portion of the first segment of the wellbore; optimizing, using the computing system and based on the first mathematical expression, the first target values for the first set of optimization parameters to reduce the delta MSE; and drilling a second portion of the first segment of the wellbore using the optimized first target values for the first set of optimization parameters. Any of the foregoing embodiments may include any one of the following elements, alone or in combination with each other:

The first set of optimization parameters comprise one or more of: weight on bit, rotations per minute, standpipe pressure, and torque.

The first set of distinctive characteristics comprises one or more of: a client name, a geographical area, an expected formation, a shape of a portion of the wellbore, equipment information, and a target wellbore diameter.

The geographical area includes a field name.

The equipment information includes information identifying equipment that forms the BHA.

The shape of the portion of the wellbore comprises one or more of: a straight shape, an L-shape, and a S-shape.

The method further includes training, using the computing system, a second machine learning model using a second plurality of historical wellbore drilling records.

of the historical wellbore drilling records of the second plurality of historical wellbore drilling records comprises historical data obtained during drilling of a wellbore and upon which a delta MSE is calculated for a given depth of the wellbore.

Each of the wellbores associated with the second plurality of historical wellbore drilling records has a second set of distinctive characteristics.

An output of the second machine learning model is a second mathematical expression representing a relationship between a second set of optimization parameters and the delta MSE when drilling a wellbore that has the second set of distinctive characteristics.

The first mathematical expression is different from the second mathematical expression.

The first set of optimization parameters are different from the second set of optimization parameters.

The method further includes generating, using the computing system, second target values for the second set of optimization parameters for drilling a second segment of the wellbore.

The method further includes drilling a first portion of the second segment of the wellbore using the BHA and the second target parameters.

The second segment of the wellbore has the second set of distinctive characteristics;

The method further includes monitoring, using the computing system, drilling parameters during the drilling of the first portion of the second segment of the wellbore using the second target parameters.

The method further includes calculating based on the monitored drilling parameters and using the computing system, the delta MSE associated with the first portion of the second segment of the wellbore.

The method further includes optimizing using the computing system and based on the second mathematical expression, the second target values for the second set of optimization parameters to reduce the delta MSE.

The method further includes drilling a second portion of the second segment of the wellbore using the optimized second target values for the second set of optimization parameters.

Optimizing the first target values for the first set of optimization parameters comprises using Bayesian optimization techniques.

Optimizing the first target values for the first set of optimization parameters occurs after a first stand of drill pipe is coupled to the BHA that creates the wellbore and before a second consecutive stand of drill pipe is coupled to the BHA.

Thus, an apparatus for drilling a first segment of a wellbore that has a first set of distinctive characteristics has been described. Embodiments of the apparatus may generally include a non-transitory computer readable medium having stored thereon a plurality of instructions, wherein the instructions are executed with at least one processor so that the following steps are executed: training, using computing system, a first machine learning model using a first plurality of historical wellbore drilling records; wherein each of the historical wellbore drilling records of the first plurality of historical wellbore drilling records comprises historical data obtained during drilling of a wellbore and upon which a delta mechanical specific energy ("MSE") is calculated for a given depth of the wellbore; wherein the delta MSE is a difference between a surface MSE and a bottom hole assembly ("BHA") MSE for the given depth; wherein each of the wellbores associated with the first plurality of historical wellbore drilling records has the first set of distinctive characteristics; and wherein an output of the first machine learning model is a first mathematical expression representing a relationship between a first set of optimization parameters and the delta MSE when drilling a wellbore that has the first set of distinctive characteristics; generating, using the computing system, first target values for the first set of optimization parameters for drilling of the wellbore; drilling a first portion of the first segment of the wellbore using the first target values for the first set of optimization parameters; monitoring, using the computing system, drilling parameters during the drilling of the first segment of the wellbore using the first target parameters; calculating, based on the monitored drilling parameters, the delta MSE associated with the first portion of the first segment of the wellbore; optimizing the first target values for the first set of optimization parameters, using the first mathematical expression and in response to the calculated delta MSE, to reduce the delta MSE; and drilling a second portion of the first segment of the wellbore using the optimized first target values for the first set of optimization parameters. Any of the foregoing embodiments may include any one of the following elements, alone or in combination with each other:

The first set of optimization parameters comprise one or more of: weight on bit, rotations per minute, standpipe pressure, and torque.

The first set of distinctive characteristics comprises one or more of: a client name, a geographical area, an expected formation, a shape of a portion of the wellbore, equipment information, and a target wellbore diameter.

The geographical area includes a field name.

The equipment information includes information identifying equipment that forms the BHA.

The shape of the portion of the wellbore comprises one or more of: a straight shape, an L-shape, and a S-shape.

The execution of the instructions results in the following step also being executed: training, using the computing system, a second machine learning model using a second plurality of historical wellbore drilling records. of the historical wellbore drilling records of the second plurality of historical wellbore drilling records comprises historical data obtained during drilling of a wellbore and upon which a delta MSE is calculated for a given depth of the wellbore.

Each of the wellbores associated with the second plurality of historical wellbore drilling records has a second set of distinctive characteristics.

An output of the second machine learning model is a second mathematical expression representing a relationship between a second set of optimization parameters and the delta MSE when drilling a wellbore that has the second set of distinctive characteristics.

The first mathematical expression is different from the second mathematical expression.

The first set of optimization parameters are different from the second set of optimization parameters.

The execution of the instructions results in the following step also being executed: generating, using the computing system, second target values for the second set of optimization parameters for drilling a second segment of the wellbore.

The execution of the instructions results in the following step also being executed: drilling a first portion of the second segment of the wellbore using the BHA and the second target parameters.

The second segment of the wellbore has the second set of distinctive characteristics;

The execution of the instructions results in the following step also being executed: monitoring, using the computing system, drilling parameters during the drilling of the first portion of the second segment of the wellbore using the second target parameters.

The execution of the instructions results in the following step also being executed: calculating based on the monitored drilling parameters and using the computing system, the delta MSE associated with the first portion of the second segment of the wellbore.

The execution of the instructions results in the following step also being executed: optimizing using the computing system and based on the second mathematical expression, the second target values for the second set of optimization parameters to reduce the delta MSE.

The execution of the instructions results in the following step also being executed: drilling a second portion of the second segment of the wellbore using the optimized second target values for the second set of optimization parameters.

Optimizing the first target values for the first set of optimization parameters comprises using Bayesian optimization techniques.

Optimizing the first target values for the first set of optimization parameters occurs after a first stand of drill pipe is coupled to the BHA that creates the wellbore and before a second consecutive stand of drill pipe is coupled to the BHA.

Thus, a method of optimizing drilling instructions for segments of a wellbore has been described. Embodiments of the method may generally include: calculating mathematical approximations of energy transfer loss between a top drive and a bottom hole assembly coupled to the top drive using a neural network and a plurality of drilling records for segments of wellbores that are similar to the segment of the wellbore to be drilled; calculating a first set of drilling instructions based on a first mathematical approximation; calculating a second set of drilling instructions based on a second mathematical approximation; wherein the second mathematical approximation is different from the first mathematical approximation; drilling a first portion of a first segment of the wellbore using the first set of drilling instructions; monitoring the energy transfer loss between a top drive associated with the wellbore and a bottom hole assembly associated with the wellbore while drilling the first portion of the first segment of the wellbore; optimizing the first set of drilling instructions using the first mathematical approximation to minimize the energy transfer loss between the top drive and the bottom hole assembly; drilling a second portion of the first segment of the wellbore using the optimized first set of drilling instructions; drilling a first portion of a second segment of the wellbore using the second set of drilling instructions; monitoring the energy transfer loss between the top drive and the bottom hole assembly while drilling the first portion of the second segment of the wellbore; optimizing the second set of drilling instructions using the second mathematical approximation to minimize the energy transfer loss between the top drive and the bottom hole assembly; and drilling a second portion of the second segment of the wellbore using the optimized second set of drilling instructions. Any of the foregoing embodiments may include any one of the following elements, alone or in combination with each other: optimizing the first set of drilling instructions includes using Bayesian optimization techniques.

In several example embodiments, while different steps, processes, and procedures are described as appearing as distinct acts, one or more of the steps, one or more of the processes, and/or one or more of the procedures could also be performed in different orders, simultaneously and/or sequentially. In several example embodiments, the steps, processes and/or procedures could be merged into one or more steps, processes and/or procedures.

It is understood that variations may be made in the foregoing without departing from the scope of the disclosure. Furthermore, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative example embodiments.

Any spatial references such as, for example, "upper," "lower," "above," "below," "between," "vertical," "horizontal," "angular," "upwards," "downwards," "side-to-side," "left-to-right," "right-to-left," "top-to-bottom," "bottom-to-top," "top," "bottom," "bottom-up," "top-down," "front-to-back," etc., are for the purpose of illustration only and do not limit the specific orientation or location of the structure described above.

In several example embodiments, one or more of the operational steps in each embodiment may be omitted or rearranged. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several example embodiments have been described in detail above, the embodiments described are example only and are not limiting, and those of ordinary skill in the art will readily appreciate that many other modifications, changes and/or substitutions are possible in the example embodiments without materially departing from the novel teachings and advantages of the present disclosure. Accordingly, all such modifications, changes and/or substitutions are intended to be included within the scope of this disclosure as defined in the following claims. In the claims, any means-plus-function clauses use the term "means for" or "step for" and are intended to cover the structures described herein as performing the recited function and not only structural equivalents, but also equivalent structures.

What is claimed is:

1. A method of drilling a first segment of a wellbore that has a first set of distinctive characteristics, the method comprising:

training, using a computing system, a first machine learning model using a first plurality of historical wellbore drilling records;

wherein each of the historical wellbore drilling records of the first plurality of historical wellbore drilling records comprises historical data obtained during drilling of a wellbore and upon which a delta mechanical specific energy ("MSE") is calculated for a given depth of the wellbore;

wherein the delta MSE is a difference between a surface MSE and a bottom hole assembly ("BHA") MSE for the given depth;

wherein each of the wellbores associated with the first plurality of historical wellbore drilling records has the first set of distinctive characteristics; and wherein an output of the first machine learning model is a first mathematical expression representing a relationship between a first set of optimization parameters and the delta MSE when drilling a wellbore that has the first set of distinctive characteristics;

generating, using the computing system and based on the first mathematical expression, first target values for the first set of optimization parameters for drilling of the wellbore;

drilling a first portion of the first segment of the wellbore using the first target values for the first set of optimization parameters;

monitoring, using the computing system, drilling parameters during the drilling of the first segment of the wellbore;

calculating, based on the monitored drilling parameters and using the computing system, the delta MSE associated with the first portion of the first segment of the wellbore;

optimizing, using the computing system and based on the first mathematical expression, the first target values for the first set of optimization parameters to reduce the delta MSE; and drilling a second portion of the first segment of the wellbore using the optimized first target values for the first set of optimization parameters.

2. The method of claim 1, wherein the first set of optimization parameters comprise one or more of: weight on bit, rotations per minute, standpipe pressure, and torque.

3. The method of claim 1, wherein the first set of distinctive characteristics comprises one or more of: a client name, a geographical area, an expected formation, a shape of a portion of the wellbore, equipment information, and a target wellbore diameter.

4. The method of claim 3,
wherein the geographical area comprises a field name;
wherein the equipment information comprises information identifying equipment that forms the BHA; and
wherein the shape of the portion of the wellbore comprises one or more of: a straight shape, an L-shape, and a S-shape.

5. The method of claim 1, which further comprises training, using the computing system, a second machine learning model using a second plurality of historical wellbore drilling records;
wherein each of the historical wellbore drilling records of the second plurality of historical wellbore drilling records comprises historical data obtained during drilling of a wellbore and upon which a delta MSE is calculated for a given depth of the wellbore;
wherein each of the wellbores associated with the second plurality of historical wellbore drilling records has a second set of distinctive characteristics; and
wherein an output of the second machine learning model is a second mathematical expression representing a relationship between a second set of optimization parameters and the delta MSE when drilling a wellbore that has the second set of distinctive characteristics.

6. The method of claim 5, wherein the first mathematical expression is different from the second mathematical expression.

7. The method of claim 5, wherein the first set of optimization parameters are different from the second set of optimization parameters.

8. The method of claim 5, which further comprises:
generating, using the computing system and based on the second mathematical expression, second target values for the second set of optimization parameters for drilling a second segment of the wellbore;
drilling a first portion of the second segment of the wellbore using the second target values for the second set of optimization parameters;
wherein the second segment of the wellbore has the second set of distinctive characteristics;
monitoring, using the computing system, drilling parameters during the drilling of the first portion of the second segment of the wellbore;
calculating, based on the monitored drilling parameters and using the computing system, the delta MSE associated with the first portion of the second segment of the wellbore;
optimizing, using the computing system and based on the second mathematical expression, the second target values for the second set of optimization parameters to reduce the delta MSE; and drilling a second portion of the second segment of the wellbore using the optimized second target values for the second set of optimization parameters.

9. The method of claim 1, wherein optimizing the first target values for the first set of optimization parameters comprises using Bayesian optimization techniques.

10. The method of claim 1, wherein optimizing the first target values for the first set of optimization parameters occurs after a first stand of drill pipe is coupled to the BHA that creates the wellbore and before a second consecutive stand of drill pipe is coupled to the BHA.

11. An apparatus for drilling a first segment of a wellbore that has a first set of distinctive characteristics, comprising:
a non-transitory computer readable medium having stored thereon a plurality of instructions, wherein the instructions are executed with at least one processor so that the following steps are executed:
training a first machine learning model using a first plurality of historical wellbore drilling records;
wherein each of the historical wellbore drilling records of the first plurality of historical wellbore drilling records comprises historical data obtained during drilling of a wellbore and upon which a delta mechanical specific energy ("MSE") is calculated for a given depth of the wellbore;
wherein the delta MSE is a difference between a surface MSE and a bottom hole assembly ("BHA") MSE for the given depth;
wherein each of the wellbores associated with the first plurality of historical wellbore drilling records has the first set of distinctive characteristics; and
wherein an output of the first machine learning model is a first mathematical expression representing a relationship between a first set of optimization parameters and the delta MSE when drilling a wellbore that has the first set of distinctive characteristics;
generating, based on the first mathematical expression, first target values for the first set of optimization parameters for drilling of the wellbore;
drilling a first portion of the first segment of the wellbore using the first target values for the first set of optimization parameters;
monitoring drilling parameters during the drilling of the first segment of the wellbore;
calculating, based on the monitored drilling parameters, the delta MSE associated with the first portion of the first segment of the wellbore;
optimizing the first target values for the first set of optimization parameters, using the first mathematical expression and in response to the calculated delta MSE, to reduce the delta MSE; and
drilling a second portion of the first segment of the wellbore using the optimized first target values for the first set of optimization parameters.

12. The apparatus of claim 11, wherein the first target parameters comprise one or more of: weight on bit, rotations per minute, standpipe pressure, and torque.

13. The apparatus of claim 11, wherein the first set of distinctive characteristics comprises one or more of: a client name, a geographical area, an expected formation, a shape of a portion of the wellbore, equipment information, and a target wellbore diameter.

14. The apparatus of claim 13,
wherein the geographical area comprises a field name;

wherein the equipment information comprises information identifying equipment that forms a BHA used to create the wellbore; and wherein the shape of the portion of the wellbore comprises one or more of: a straight shape, an L-shape, and a S-shape.

15. The apparatus of claim 11, wherein execution of the instructions results in the following steps also being executed:

training a second machine learning model using a second plurality of historical wellbore drilling records;

wherein each of the historical wellbore drilling records of the second plurality of historical wellbore drilling records comprises historical data obtained during drilling of a wellbore and upon which a delta MSE is calculated for a given depth of the wellbore;

wherein each of the wellbores associated with the second plurality of historical wellbore drilling records has a second set of distinctive characteristics; and wherein an output of the second machine learning model is a second mathematical expression representing a relationship between a second set of optimization parameters and the delta MSE when drilling a wellbore that has the second set of distinctive characteristics.

16. The apparatus of claim 15, wherein the first mathematical expression is different from the second mathematical expression.

17. The apparatus of claim 15, wherein the first set of optimization parameters are different from the second set of optimization parameters.

18. The apparatus of claim 15, wherein execution of the instructions results in the following steps also being executed:

generating second target parameters for drilling of a second segment of the wellbore based on the second mathematical expression;

drilling a first portion of the second segment of the wellbore using the second target parameters;

wherein the second segment of the wellbore has the second set of distinctive characteristics;

monitoring drilling parameters during the drilling of the first portion of the second segment of the wellbore;

calculating, based on the monitored drilling parameters, the delta MSE associated with the first portion of the second segment of the wellbore;

optimizing the second target values for the second set of optimization parameters, using the second mathematical expression and in response to the calculated delta MSE, to minimize the delta MSE; and drilling a second portion of the second segment of the wellbore using the optimized second target values for the second set of optimization parameters.

19. A method of optimizing drilling instructions for segments of a wellbore, the method comprising:

calculating a first and second mathematical approximations of energy transfer loss between a top drive and a bottom hole assembly coupled to the top drive using a neural network and a plurality of drilling records for segments of wellbores that are similar to the segment of the wellbore to be drilled;

calculating a first set of drilling instructions based on the first mathematical approximation;

calculating a second set of drilling instructions based on the second mathematical approximation;

wherein the second mathematical approximation is different from the first mathematical approximation;

drilling a first portion of a first segment of the wellbore using the first set of drilling instructions;

monitoring the energy transfer loss between a top drive associated with the wellbore and a bottom hole assembly associated with the wellbore while drilling the first portion of the first segment of the wellbore;

optimizing the first set of drilling instructions using the first mathematical approximation to minimize the energy transfer loss between the top drive and the bottom hole assembly;

drilling a second portion of the first segment of the wellbore using the optimized first set of drilling instructions;

drilling a first portion of a second segment of the wellbore using the second set of drilling instructions;

monitoring the energy transfer loss between the top drive and the bottom hole assembly while drilling the first portion of the second segment of the wellbore;

optimizing the second set of drilling instructions using the second mathematical approximation to minimize the energy transfer loss between the top drive and the bottom hole assembly; and drilling a second portion of the second segment of the wellbore using the optimized second set of drilling instructions.

20. The method of claim 19, wherein optimizing the first set of drilling instructions comprises using Bayesian optimization techniques.

* * * * *